United States Patent [19]

Snyder

[11] Patent Number: 4,715,872

[45] Date of Patent: Dec. 29, 1987

[54] PORTABLE DUST COLLECTOR

[75] Inventor: Steven A. Snyder, Spring Valley, Ohio

[73] Assignee: Shopsmith, Inc., Dayton, Ohio

[21] Appl. No.: 909,739

[22] Filed: Sep. 19, 1986

[51] Int. Cl.$^4$ .................................... B01D 46/02
[52] U.S. Cl. .................................... 55/315; 55/357; 55/366; 55/378; 55/429; 55/472; 55/473
[58] Field of Search .................... 15/340, 347, 412; 55/315, 337, 357, 361, 366, 378, 429, 472, 473, 319, DIG. 3

[56] References Cited

U.S. PATENT DOCUMENTS

| | | |
|---|---|---|
| 799,575 | 9/1905 | Overholt . |
| 956,148 | 4/1910 | Bennett . |
| 1,136,434 | 5/1915 | Overholt . |
| 1,613,250 | 1/1927 | Spielman . |
| 1,672,001 | 6/1928 | Serva et al. . |
| 2,125,850 | 8/1938 | Norris . |
| 2,171,754 | 9/1939 | Jeunesse . |
| 2,219,567 | 11/1940 | Spielman . |
| 2,242,278 | 5/1941 | Yonkers, Jr. . |
| 2,276,844 | 3/1942 | Holm-Hansen . |
| 2,277,069 | 3/1942 | Burwell . |
| 2,435,490 | 2/1948 | Beager et al. . |
| 2,439,182 | 4/1948 | Nuffer et al. . |
| 2,778,441 | 1/1957 | Herriott . |
| 2,960,713 | 11/1960 | Wistrand ............................ 15/412 |
| 3,358,316 | 12/1967 | Okun . |
| 3,636,864 | 1/1972 | Loscialo ............................ 55/315 X |
| 3,813,725 | 6/1974 | Rinker ............................ 15/347 |
| 3,853,517 | 12/1974 | Mitchell ............................ 55/DIG. 3 X |
| 3,909,219 | 9/1975 | Fromknecht ............................ 55/216 |
| 3,910,781 | 10/1975 | Bryant, Jr. ............................ 55/305 |
| 4,052,765 | 10/1977 | Muhne et al. ............................ 15/413 X |
| 4,133,658 | 1/1979 | Callewyn ............................ 55/315 |
| 4,172,710 | 10/1979 | Van der Molen ............................ 55/337 X |
| 4,531,258 | 7/1985 | Spellman ............................ 15/327 |
| 4,533,371 | 8/1985 | Nakamura ............................ 15/347 X |
| 4,581,050 | 4/1986 | Krantz ............................ 55/337 X |

OTHER PUBLICATIONS

"Inca Waste Collector Model No. 01K01.01" brochure (no publication date).
"DeWalt Dust Extractor System Model 3592" brochure (no publication date).
"Cyclair Dust Collector Units Models 55 & 75" brochure (no publication date).
"Elektra Beckum Dust Extractor SPA1000" brochure (no publication date).

Primary Examiner—Charles Hart
Attorney, Agent, or Firm—Biebel, French & Nauman

[57] ABSTRACT

A portable dust collector which includes a housing having a dust-proof chamber, a motor and blower enclosed within the chamber, a centrifugal blower driven by the motor and exhausting through a diffuser into the housing, a filter bag enclosing the top of the housing, a collection bag enclosing the bottom of the housing, and a support extending downwardly from the housing to the base for providing clearance below the housing sufficient for the collection bag. By positioning the motor within a dust-proof chamber inside the housing, the dust collector has better balance and portability and requires less floor and storage space than prior art collectors with exterior motors. The collector also includes a diffuser which is attached to the blower outlet and is shaped to direct the effluent from the blower downwardly into the collection bag. The diffuser includes a bell-shaped passage having a flared exit opening, which is greater in area than the mouth of the diffuser attached to the blower, so that the blower effluent is reduced in noise velocity prior to entering the collection bag. The motor is oriented radially and horizontally within the housing and the blower inlet oriented horizontally so that an open space is provided for free air flow between the filter and collection bags through the housing.

22 Claims, 8 Drawing Figures

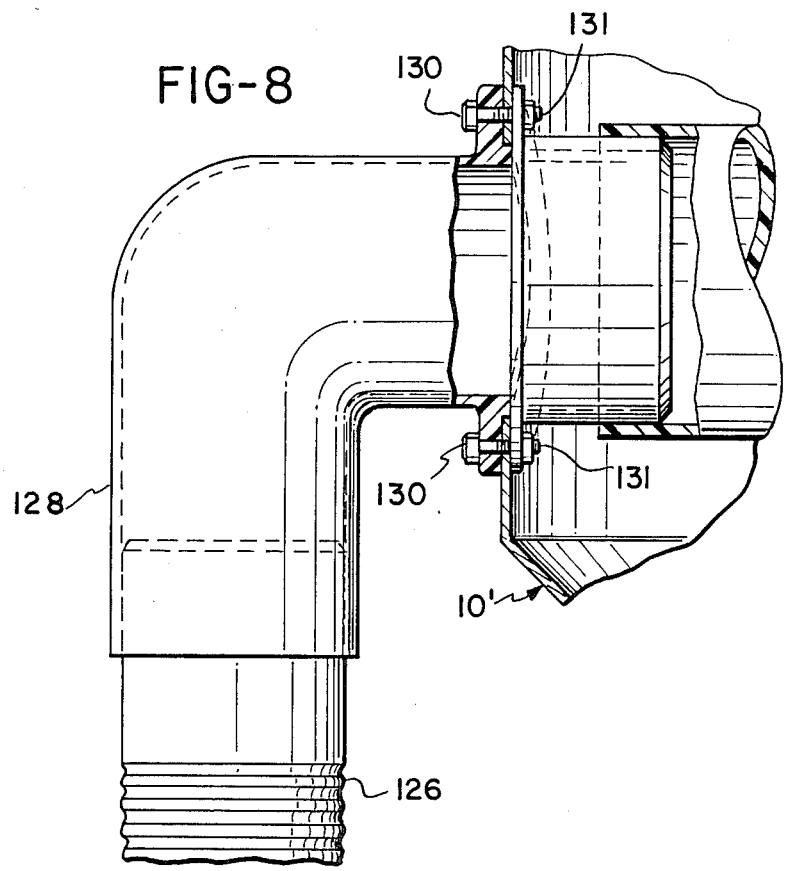

PORTABLE DUST COLLECTOR

BACKGROUND OF THE INVENTION

The present invention relates to dust collectors and, more particularly, dust collectors of the type having a large volume filter bag and a removable collection bag.

Dust collectors are a desirable and quite frequently indispensable component of a woodworking shop. Unlike shop vacuum cleaners, in which a high speed universal motor (typically 15,000 rpm) drives a small diameter fan to generate a low volume air flow rate at a relatively high pressure rise, a dust collector utilizes a relatively low speed induction motor (typically 3,500 rpm) which drives a large diameter fan. Consequently, dust collectors generate a large volume air flow rate with a relatively moderate pressure rise. In addition, the filter area of most dust collectors is relatively large in comparison to that of shop vacuums. That feature, combined with the relatively low air velocity, results in the pressure differential across the filter media being relatively low, which highly increases the efficiency of dust removal.

The typical dust collector includes a housing having upper and lower openings, an internally or externally mounted blower, an externally mounted motor driving the blower, and a stand supporting the housing. A filter bag is attached to the upper opening and is made of a fabric material, such as cotton, which allows the air exhausted by the blower to exit the housing while retaining dust particles. The lower opening is covered by a collection bag which is made of plastic and is impermeable to air. The inlet to the blower is adapted to receive a large flexible hose (typically four to six inches in diameter) which usually is connected to a woodworking tool for purposes of removing sawdust and wood chips generated during a cutting operation.

The filter bag typically is shaped to provide a large surface area for air flow out of the housing, and is removable from the lower opening of the housing to facilitate its being emptied or changed. The support stand typically consists of a base which supports a collection bag and, in some cases, includes casters so that the dust collector may be moved to a desired location.

However, existing dust collectors have several disadvantages. For example, while the externally-mounted motor is free of the dust and chip laden environment of the interior of the housing, its weight tends to shift the center of gravity outwardly from the center of the housing, making the dust collector more susceptible to tipping. Furthermore, a dust collector having an externally mounted motor may have to be constructed to have a large "footprint"; that is, a protruding motor may result in the dust collector taking up more floor space than would be required for an internally mounted motor.

Another disadvantage of such dust collectors is that they typically include a single, large diameter hose which is attached either to a woodworking tool or to a floor intake. Accordingly, they are not designed to connect the dust collector to several pieces of equipment simultaneously.

Furthermore, the external location of large motors and blowers of such dust collectors causes them to be relatively noisy. In addition, the air exiting the blower within the housing may be at a relatively high velocity and tend to churn the dust and chips within the collection bag. This causes larger size chips and dust particles to adhere to the inside surface of the filter bag, reducing the effectiveness of the filter.

Accordingly, there is a need for a dust collector which has a center of gravity located near the center of the housing to promote stability of the collector, and which has a relatively small footprint, for its capacity, to improve portability and minimize space requirements. Furthermore, there is a need for a dust collector which can accept either a single large hose (e.g. four-inch diameter) or multiple hoses of smaller size (e.g. two and one half inch diameter) so that the collector may be used with several pieces of home workshop woodworking equipment or cleanup tools/accessories simultaneously. There is also a need for a dust collector that is relatively quiet in operation and in which the churning of the collected material by the blower exhaust is minimized. Finally, there is a need for a dust collector which utilizes standard plastic trash bags which can be changed quickly, making it appropriate for home use.

SUMMARY OF THE INVENTION

The present invention is a dust collector which is specially designed to be used either in light commercial or domestic environments. The dust collector is more compact and has a smaller footprint than prior art dust collectors of comparable capacity. Furthermore, the dust collector of the present invention is adapted to receive either one or a plurality of hoses, so that either one major operation or several lesser dust/chip collecting operations can be conducted simultaneously. In addition, the dust collector of the present invention includes an internal diffuser which reduces noise and lowers the velocity of air leaving the blower to reduce churning of the collected material within the collector.

The dust collector of the present invention includes a housing having an outer sidewall with a substantially open top and bottom, a filter bag mounted removably to the top opening and a collection bag mounted on the bottom opening, and a motor and blower mounted within the housing. The motor is sealed within a dust-proof chamber which is vented to the outside. By providing a chamber for the motor which is internal to the housing, the center of gravity of the dust collector is located more toward the center of the collector housing than in prior art models, and the external size and foot print of the dust collector is minimized, thereby reducing its space requirements. Also, the compact arrangement of the design is well suited to provide an attractive external appearance treatment as a consumer product. The motor extends transversely of the housing and is directly coupled to a centrifugal blower, which in the preferred embodiment has an upwardly opening exhaust.

The dust collector includes a diffuser having a mouth that attaches to the exhaust opening of the blower and a bell portion having a substantially larger exit opening facing downwardly within the housing toward the collection bag. The exit opening of the diffuser has a much larger cross sectional area than the mouth, preferably at least in a ratio of 4 to 1, so that the velocity of air leaving the exit opening is reduced substantially from the velocity of the air entering the diffuser. The diffuser minimizes noise emitted from the dust collector by reducing air velocity and hence air noise within the diffuser interior and by shielding the high velocity airflow from the ears of bystanders. The diffuser preferably is made from a sound absorbing material, such as ABS plastic (acrylonitrile butadiene styrene).

An important feature of the invention lies in the arrangement of the components within the housing. It was found that by providing a motor which is horizontally mounted and extends transversely within the housing, and which is directly coupled to a blower with an upwardly opening outlet, an effective diffuser could be attached to the blower and still leave a passage between the filter and collection bags of sufficient size to allow free flow of air and particles between the two. Furthermore, by providing an upwardly opening blower, a diffuser could be designed which includes an elbow to change the direction of the blower exhaust downwardly and a flared exit opening spaced a maximum distance from the collection bag into which it empties. In addition to presenting a narrow profile in plan view, the horizontal orientation of the blower inlet allows a straight inlet conduit to be used, which also minimizes the obstructions between the filter and collection bags.

The dust collector of the present invention includes a manifold which is mounted on the exterior surface of the collector housing and is connected by a straight conduit to the blower inlet. The manifold has multiple openings, each of which is adapted to receive a separate vacuum hose. The air flow developed by the motor-blower combination is such that, should only one or two hoses be required, the other hoses can simply be removed from the manifold, leaving an open port through which room air can be drawn in and the dust filtered out. The manifold is designed such that the inlet ports are disposed at sharp angles to the inlet conduit and blower intake. This angular orientation allows the dust collector to meet UL (Underwriters Laboratory, Inc.) specifications for dust collecting systems, which require that a probe having a one-half inch diameter and unlimited length cannot be inserted into the port and contact the blower.

To utilize a single, large diameter hose, the manifold is removed from the collector housing and a flanged adapter is attached to the outer surface of the housing.

Accordingly, it is an object of the present invention to provide a dust collector having an internally mounted motor and blower so that the center of gravity of the dust collector is centrally located and so that the dust collector has a relatively small space requirement footprint; a dust collector in which the velocity of the air leaving the blower is decreased to minimize the churning of the contents of the collection bag; a dust collector in which the noise created by the blower, the air flow, and the motor is minimized; a dust collector which can accommodate one or a plurality of hoses simultaneously; and a dust collector which permits unlimited filter height and surface area, provides for easy removal, replacement, and disposal of plastic collection bags of a standard size and offers superior portability/mobility for residential use.

Other objects and advantages of the invention will become apparent from the following description, the accompanying drawings, and the appended claims.

BRIEF DESCRIPTION OF THE DRAWINGS

FIG. 8 is a detail showing the hose connection of an alternate embodiment of the invention.

DETAILED DESCRIPTION OF THE PREFERRED EMBODIMENTS

Figure 1:
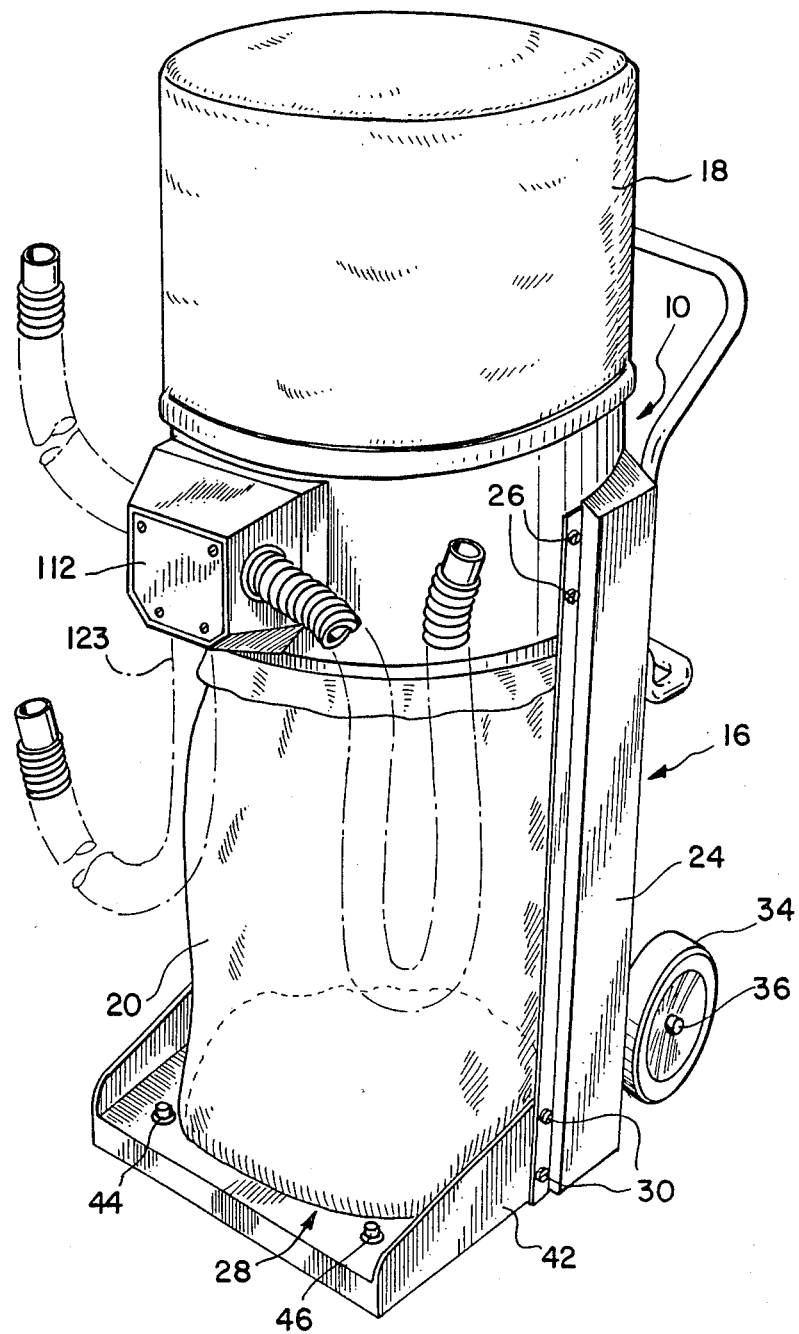
FIG. 1 is perspective view of the portable dust collector of the present invention.
Figure 2:
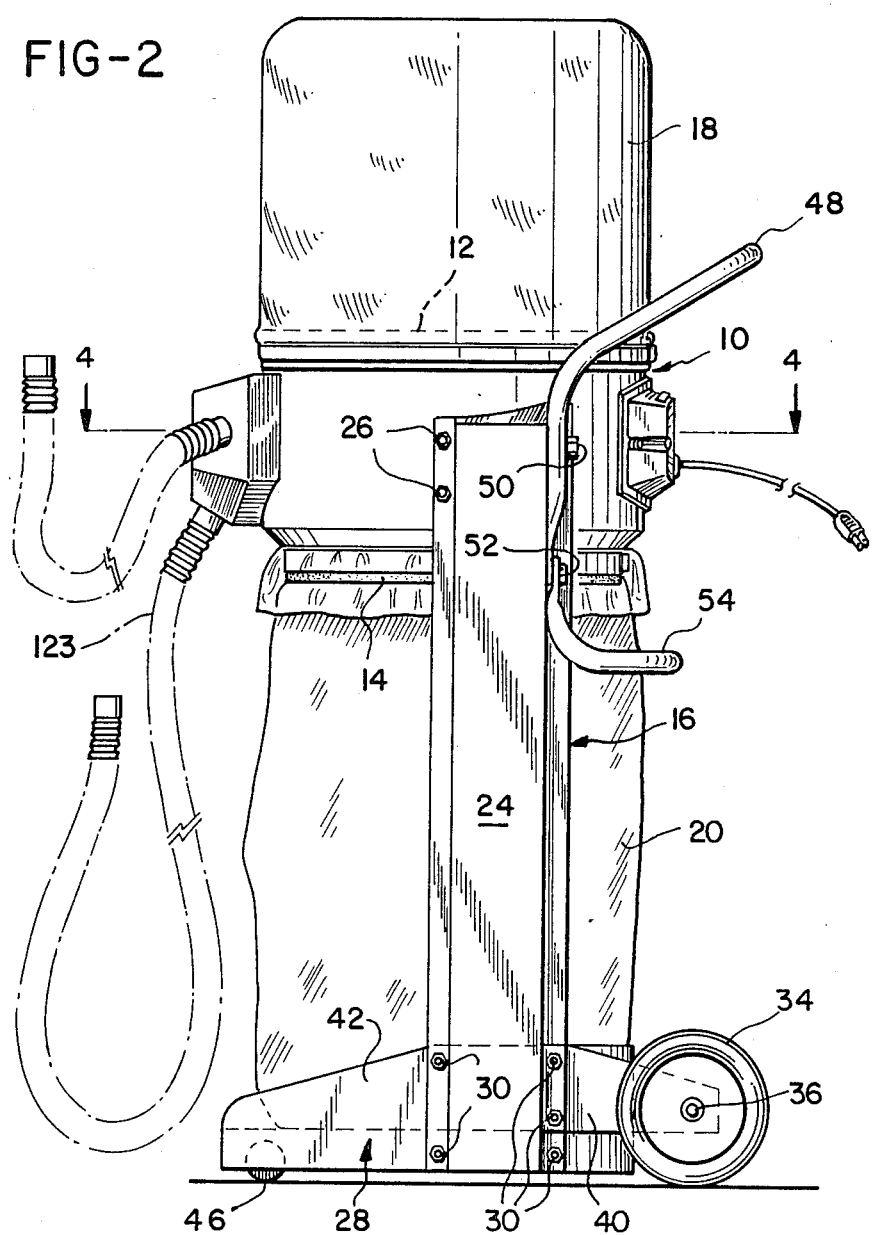
FIG. 2 is a side elevation of the dust collector of FIG. 1.
Figure 3:
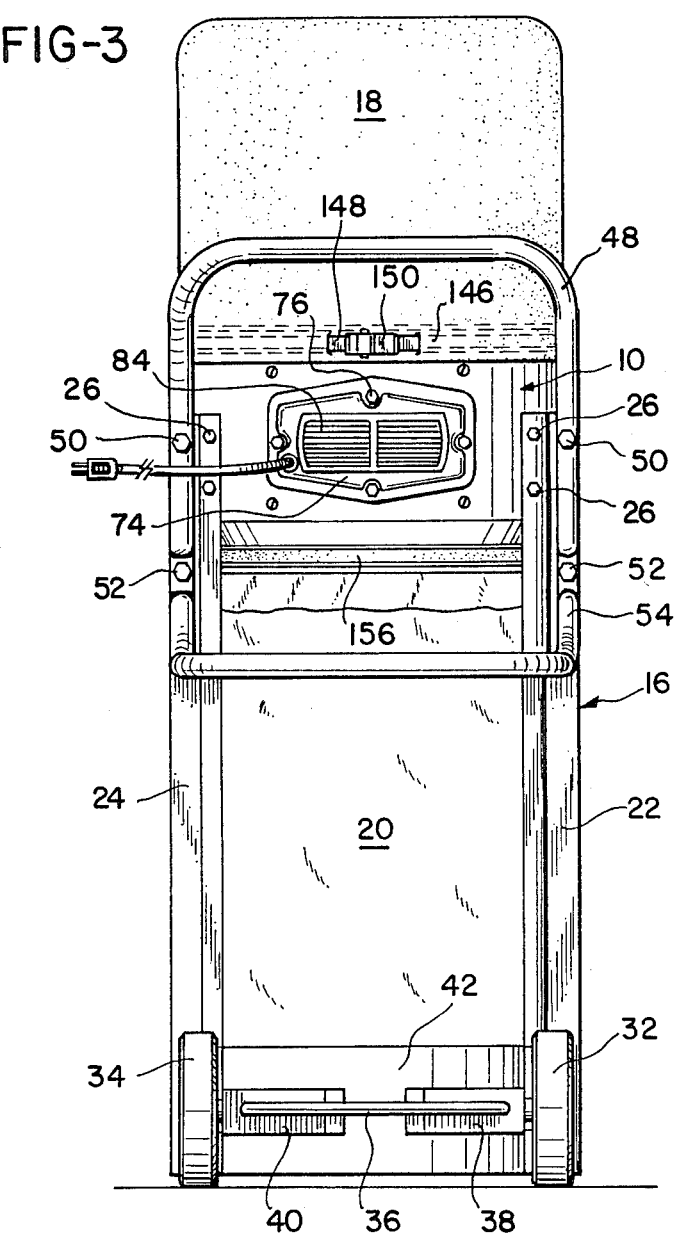
FIG. 3 is a rear elevation of the dust collector of FIG. 1.

As shown in FIGS. 1, 2, and 3, the dust collector of the present invention includes a cylindrical housing, generally designated 10, having an open top and bottom 12, 14 (see also FIG. 5) and is connected to a support frame, generally designated 16. The top 12 receives a cylindrically shaped filter bag 18, preferably made of a fabric such as needled polyester felt. The open bottom 14 receives a plastic collection bag 20.

The support frame 16 includes a pair of vertically extending legs 22, 24, which are attached at their upper ends to the housing 10 by screws 26. The lower ends of the legs are attached to a flat base 28 by screws 30. The base 28 includes a pair of rear wheels 32, 34, each mounted on an end of an axle 36 which is journaled into brackets 38, 40 attached to the side wall 42 of the base 28. The front of the base 28 is open and is supported by a pair of casters 44, 46, which are attached to the underside of the base.

An upper handle 48 is attached to the legs 22, 24 by pairs of bolts 50, 52. Similarly, lower handle 54 is attached to the legs 22, 24 by bolts 52. The upper handle is curved to extend above the top 12 of the housing 10, and the lower handle 54 is curved to extend below the bottom 14 of the housing. The upper handle 48 extends outwardly from the housing 10 such that the transverse portion of the handle is vertically aligned with the rear wheels 32, 34 of the base 28. This positioning aids in the tilting of the dust collector so that it can be pushed or pulled while supported solely by the rear wheels.

Alternately, the casters 44, 46 support the dust collector, along with the rear wheels 32, 34, when it is in a stationary upright position or when it is pushed or pulled without first being tilted. The rear wheels 34, 36 and casters 44, 46 are positioned such that they are vertically offset outwardly from the housing 10 to provide points of support outwardly from the center of gravity of the dust collector in order minimize its tipping.

Figure 4:
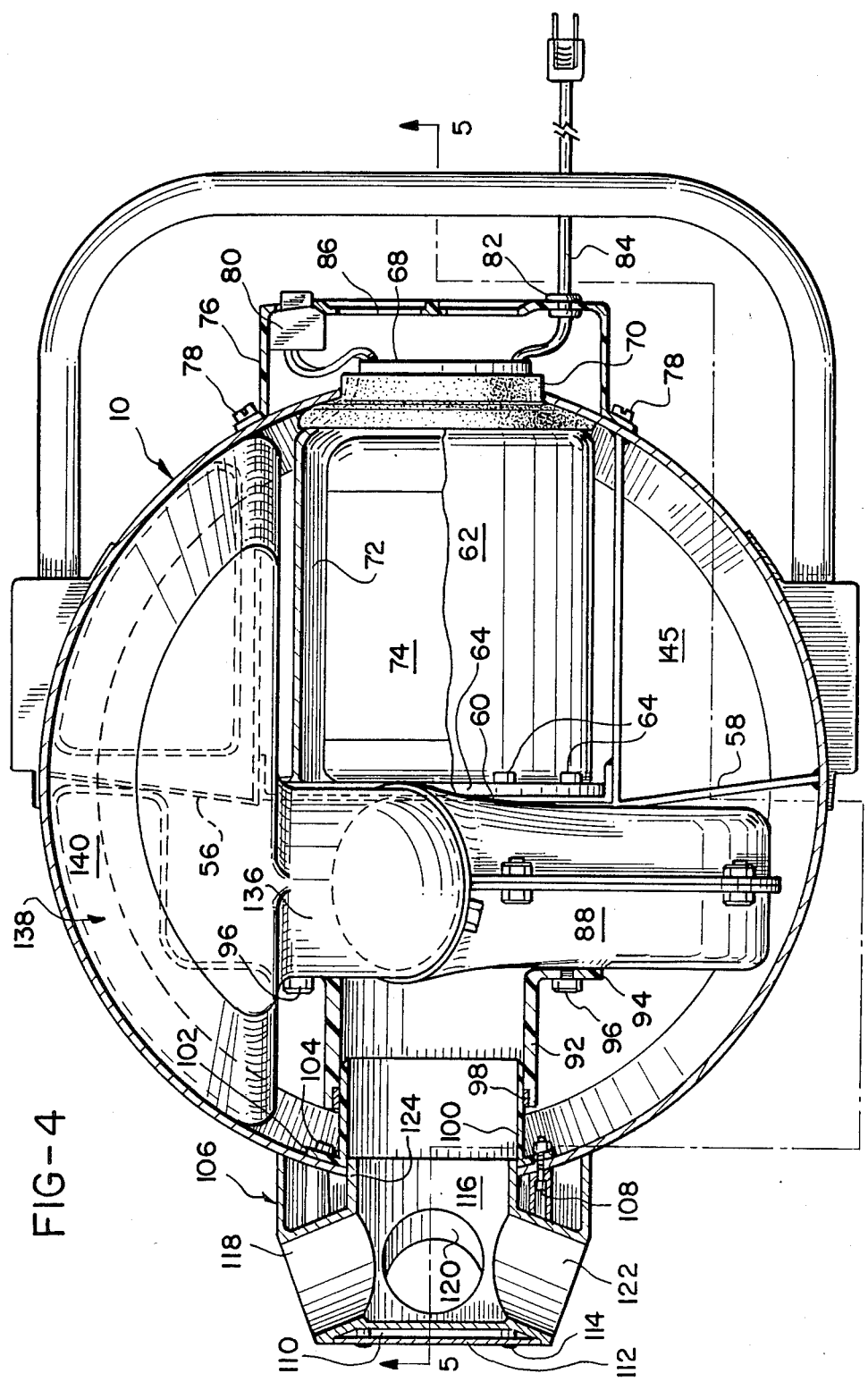
FIG. 4 is a top plan section of the dust collector taken at line 4—4 of FIG. 2.
Figure 5:
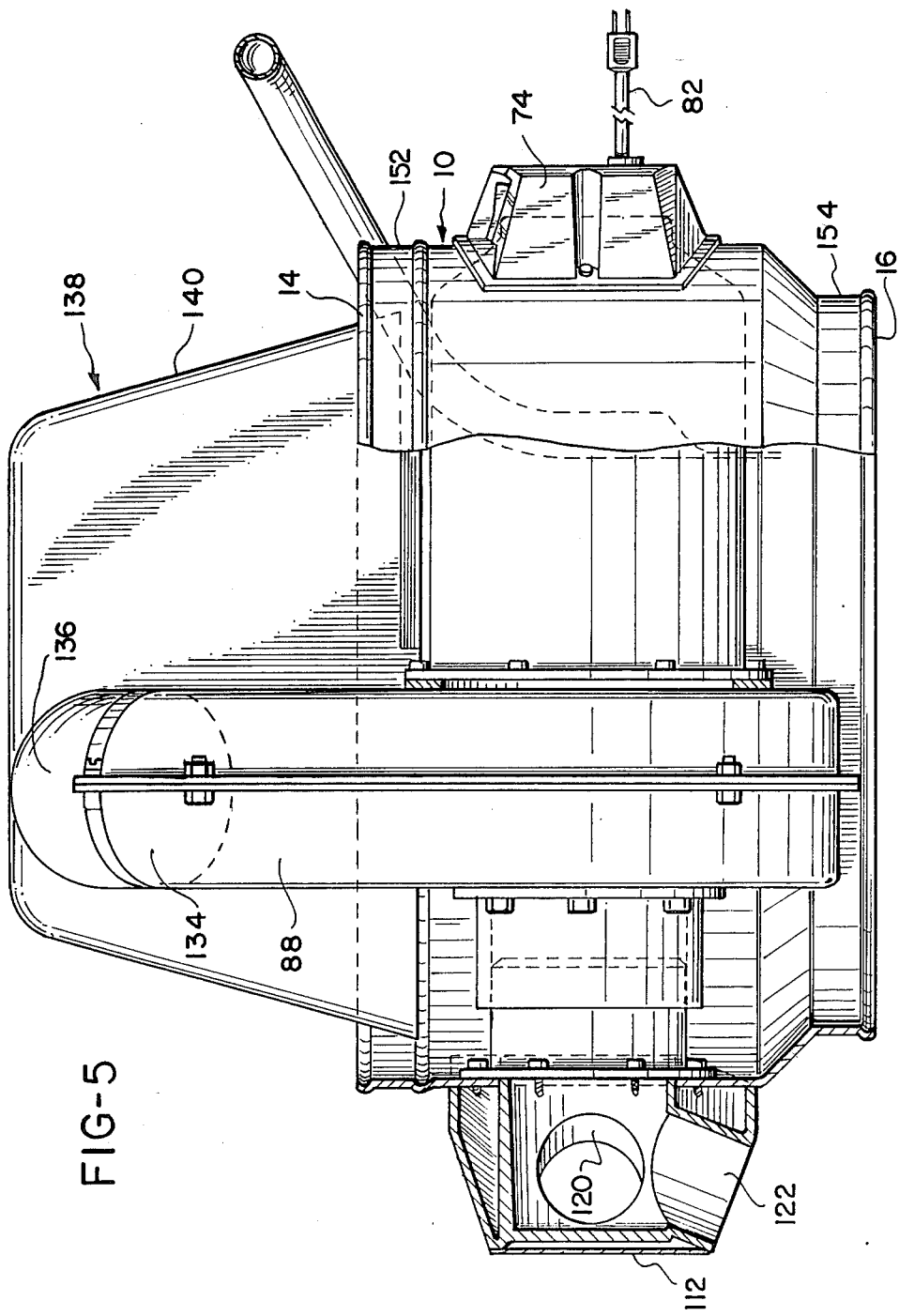
FIG. 5 is a detail showing a side elevation of the housing of the dust collector, taken at line 5—5 of FIG. 4.

As shown in FIGS. 4 and 5, the housing 10 includes a pair of L-shaped interior brackets 56, 58 which are welded at their ends to the interior surface of the housing wall. A U-shaped mounting plate 60 extends between the brackets 56, 58 and is attached to them by tack welds. A tubular plastic wall 62 includes a peripheral flange at 64 which is attached to the mounting plate 60 by bolts 66. The tubular wall 62 extends outwardly toward the housing 10 and includes an outer end 68 which protrudes through an opening 70 in the housing. The outer end 68 includes a vent (not shown) which allows the interior of the tubular wall to communicate with the atmosphere.

The tubular wall 62, together with the mounting plate 60, form a dust-proof chamber 72 within the interior of the housing 10. An electric motor 74 is bolted to the mounting plate 60 and is positioned radially and horizontally within the chamber 72 and housing 10. A cover plate 76 is attached to the outer surface of the housing 10 by screws 78. The cover plate 76 supports a switch 80 for controlling the motor 74 and a strain relief 82 which supports the power cord 84 for the motor. The cover plate 76 also includes a vent 86 which allows air to circulate through the vent in the outer end 68 of the chamber 72.

Figure 6:
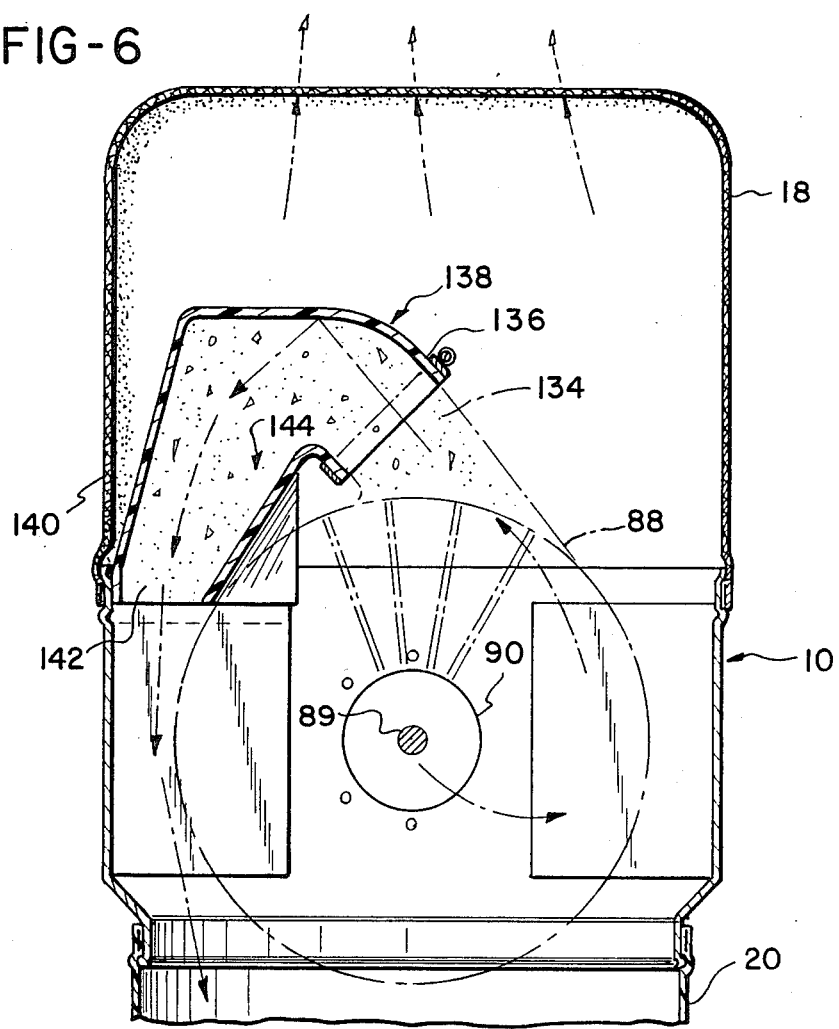
FIG. 6 is a somewhat schematic detail showing a side elevation in section of the dust collector of FIG. 1.
Figure 7:
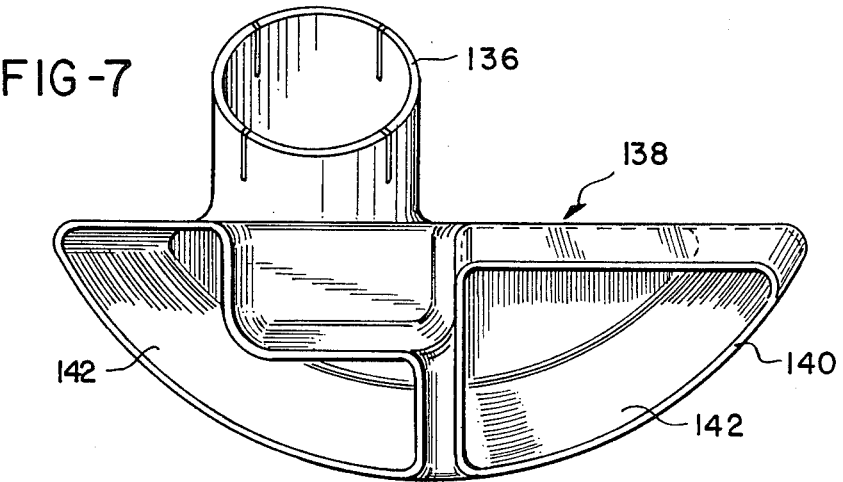
FIG. 7 is a bottom plan view of the diffuser of the dust collector of FIG. 1.

As shown in FIGS. 4, 5, and 6, the output shaft of the motor 72 is directly coupled to a centrifigal blower 88 which is attached to the mounting plate 60 and is oriented vertically within the housing 10 such that the rotational axis of blower wheel 89 is collinear with the output shaft of the motor 72. The blower 88 has a central, horizontally disposed inlet orifice 90 which is enclosed by a cylindrical conduit 92 that includes a flange 94 attached to the blower 88 by screws 96. The conduit 92 includes an outer end having an inner peripheral gasket 98. An outer conduit 100 is shaped to telescope within the conduit 92 and includes a peripheral flange 102 at its outer end which is attached to the housing 10 by screws 104. The cylindrical conduit 92 and inner conduit 100 together form a horizontal, rectilinear inlet conduit extending from the housing to the blower opening 90.

A manifold, generally designated 106, is mounted on the exterior surface of the housing 10 by bolts 108. The bolt heads are located within a recess 110 which is covered by a cover plate 112 secured to the manifold 106 by screws 114. The manifold 106 includes a central chamber 116 and three ports 118, 120, 122. The ports 118–122 are each sized to receive a 2½ inch hose 123 (see FIG. 2). The chamber 116 terminates in a cylindrical section 124 which is sized to telescope within the inner conduit 100.

The ports 118–122 are disposed at an angle to the cylindrical section 124, inner conduit 100, and cylindrical conduit 92 of approximately 70°. The ports 118–122 are dimensioned such that the angular relationship with the rectilinear inlet conduit to the blower 88 meets applicable UL standards. Specifically, a four inch long probe having a one-half inch diameter cannot be inserted into any one of the ports and contact the blower 88. In a specific embodiment, the ports are sized to have a diameter of approximately 2.3 inches, and are spaced from the blower a distance of approximately 5 inches. With this spacing, orienting the ports 118–120 at 70° angles with a central axis of the inlet conduit meets the aforementioned UL standards.

In an alternate embodiment of the invention, shown in FIG. 8, the dust collector 10' is modified to accept a single, four-inch diameter flexible hose 126. The hose 126 is attached to an elbow 128 which, in turn, is attached to the housing 10 by bolts 130 and nuts 131. The elbow 128 is sized such that it, too, meets UL standards, in that the aforementioned probe cannot be inserted into the opening 132 of the elbow and contact the blower 88.

As shown in FIGS. 4, 5, 6, and 7, the blower 88 includes an outlet 134 which telescopes into the mouth 136 of a diffuser, generally designated 138. The diffuser 138 is made of ABS plastic and includes a bell-shaped portion 140 which terminates in an exit opening 142. The opening 142 includes a bridge 143 that fits over the bracket 56. The blower 88 is oriented within the housing 10 so that the outlet 134 discharges generally upwardly in the direction of the filter bag 18 (see FIG. 1). The diffuser 138 is shaped such that the exit opening 142 faces generally downwardly toward the collection bag 20 (see FIG. 1). The area of the exit opening 142 is much larger than that of the mouth 136, and in the preferred embodiment is approximately four times greater.

The diverging walls of the bell-shaped portion 140, combined with the increase in area of the exit opening 142 over the mouth 136 and the change of direction of the air within the diffuser, result in reducing the velocity of the air and particles 144 leaving the blower 88 through the outlet 134. Furthermore, the elbow shape of the diffuser 138 directs the air and debris leaving the blower 88 downwardly into the collection bag so that dust and chip particles are not embedded in the filter bag 18. Another advantage of the design of the dust collector is that the exit opening 142 is spaced away from the collection bag 20 a distance equivalent to the height of the housing 10, so that the velocity of the air and particles entering the collection bag is further reduced.

The radial, horizontal orientation of the motor 74, and the vertical orientation of the blower 88, allow a diffuser 138 to be used which includes a bell portion 140 of substantial size, yet leaves large, open areas 145 in the housing which allow free air flow between the filter and collection bags 18, 20 (see FIG. 1). At the same time, the diameter of the housing is maintained at a minimum: in the preferred embodiment less than twice the length of the motor. In one actual application a housing 10 was formed having a diameter of 18.38 inches, and received a motor within a cylindrical wall of 10 inches in length.

The filter bag 18, shown in FIGS. 1 and 3, preferably includes a hem 146 that receives a strap 148 that can be tightened and loosened by an overcenter buckle 150. The bag 18 is attached to the upper rim 152 of the housing (see FIG. 5). The collection bag 20 is attached to the lower rim 154 of the housing by an elastic band 156. Accordingly, both the filter bag 18 and collection bag 20 can be removed and replaced quickly as needed. It is anticipated that the filter bag 18 need not be replaced frequently, however it may be necessary occasionally to clean or shake out the bag 18 in order to remove embedded dust particles from the fabric.

The operation of the dust collector is as follows. The appropriate hoses are attached to the manifold 106 or, if the single four-inch hose 126 is being utilized, it is attached to the elbow 128. The cord 84 is plugged into a convenient grounded receptacle and the switch 80 actuated to start the motor.

The blower 88 draws dust and particle laden air through the inlet conduit and exhausts it through the diffuser 138 downwardly into the collection bag 20. As the pressure builds up within the dust collector, the collector bag 18 is inflated to the configuration shown in FIG. 1, and the collection bag 20 inflated in a similar fashion. After use, the collection bag 20 may be removed easily from the bottom 14 of the housing 10 and emptied or replaced.

While the forms of apparatus herein described constitute preferred embodiments of this invention, it is to be understood that the invention is not limited to these precise forms of apparatus, and that changes may be made therein without departing from the scope of the invention.

What is claimed is:

1. A portable dust collector comprising:
   housing having an outer side wall, a substantially open top, a substantially open bottom, and a dust-proof chamber within an interior thereof:

a motor enclosed within said chamber;

blower means driven by said motor for drawing air into said housing, said blower means being enclosed with said interior and having an inlet extending through said housing and communicating with an exterior thereof, and an outlet discharging within said housing;

said chamber and blower means being shaped to form a passageway within said chamber between said open top and bottom;

filter bag means attached to and enclosing said top for retaining particulates discharged into said interior by said blower while allowing air to pass therethrough;

collection bag means attached to and enclosing said bottom for collecting particulates retained in said interior of said housing, whereby particulate-laden discharged from said outlet circulates in the vicinity of said collection bag means and flows through said passageway to said filter bag means; and support means attached to and extending downwardly from said housing side wall for providing clearance below said housing sufficient for said collection bag.

2. The dust collector of claim 1 wherein said motor is oriented radially and horizontally within said housing and is directly coupled to said blower.

3. The dust collector of claim 2 wherein said blower is a centrifugal blower and is oriented vertically within said housing, said inlet includes a horizontally-extending rectilinear inlet conduit, and said outlet discharges upwardly within said collector.

4. The dust collector of claim 3 wherein said blower includes a rotational axis which is collinear with an output shaft of said motor.

5. The dust collector of claim 1 wherein said chamber is attached to said outer side wall, and said outer side wall includes vent means communicating with an interior of said chamber for allowing passage of air into said chamber.

6. The dust collector of claim 5 wherein said vent means is positioned on said housing opposite said blower inlet.

7. The dust collector of claim 1 wherein said housing includes a transverse plate extending across said interior and attached at ends thereof to an interior surface of said side wall, said transverse plate supporting said chamber, said motor, and said blower means within said housing.

8. The dust collector of claim 7 wherein said motor is attached to said transverse plate, and said chamber includes a tubular wall extending between said plate and said side wall, such that said tubular wall, said plate, and said side wall form said chamber.

9. The dust collector of claim 1 wherein said housing is substantially cylindrical in shape and said top and bottom are substantially circular in shape.

10. The dust collector of claim 1 wherein said support means includes a substantially flat base having rearwardly-mounted wheels and forwardly-mounted casters, and a pair of opposing arms extending upwardly from said base to said housing, said arms spacing said housing from said base sufficiently to position said collection bag beneath said housing, and said arms being spaced apart sufficiently to allow said collection bag to be placed therebetween.

11. The dust collector of claim 1 wherein said blower means includes a centrifugal blower; and said inlet includes a rectinlinear conduit extending from said outer side wall to a center of said blower.

12. The dust collector of claim 11 wherein said inlet includes inlet manifold means for receiving an end of a vacuum hose, said manifold means being attached to said housing and including a tubular portion connected to and being colinear with said inlet conduit, and at least one port communicating with said tubular portion and disposed at an angle thereto.

13. The dust collector of claim 12 wherein said manifold means includes a plurality of said ports, each disposed at an angle to said inlet conduit.

14. The dust collector of claim 11 wherein said inlet includes tubular collar means for connecting a single hose to said housing, said collar means being attached to an exterior of said housing and having a bend therein.

15. A dust collector comprising:

a housing having a vertically-extending, cylindrically-shaped outer side wall forming an enclosed interior, said side wall having upper and lower rims forming an open top and an open bottom, respectively, communicating with said interior;

a vertically oriented, transverse plate attached at ends thereof to an inside surface of said side wall and extending across said interior;

a tubular wall attached at one end thereof to said plate, and extending radially and horizontally therefrom to said inside surface of said side wall, thereby forming a dust-free chamber within said housing interior;

a motor mounted on said plate and extending radially and horizontally therefrom within said chamber;

a centrifugal blower mounted on said plate opposite said chamber and driven by said motor, said blower including a horizontally-extending rectilinear inlet conduit extending through said housing and communicating with an exterior thereof, an outlet discharging upwardly into said housing interior, and having a rotational axis which is collinear with an output shaft of said motor;

said side wall having an opening therethrough from an exterior of said housing into said interior of said chamber;

an inlet manifold mounted on an outer surface of said side wall and having a tubular portion connected to and being collinear with said inlet conduit, and a plurality of ports, each disposed at an angle to said tubular portion;

a dome-shaped filter bag attached to and enclosing said housing top for retaining particulates discharged into said interior by said blower;

collection bag means removably attached to and enclosing said bottom for particulates retained in said interior of said housing;

a base including forwardly mounted casters and rearwardly mounted wheels; and a pair of legs extending between said housing and said base and sized to space said housing bottom above said base sufficiently to receive said collection bag beneath said housing, said legs being positioned on opposite sides of said base.

16. A portable dust collector comprising:

a housing having an outer side wall, a substantially open top, and a substantially open bottom;

a motor attached to said housing;

a blower driven by said motor and having an inlet communicating with an exterior of said housing and an outlet discharging upwardly within said housing;

filter bag means attached to an enclosing said top for retaining particulates discharged into said interior by said blower while allowing air to pass therethrough;

collection bag means attached to and enclosing said bottom for collecting particulates retained in said interior of said housing;

diffuser means attached to said outlet and including a bell portion of increasing cross sectional area in the direction of air flow for directing air and debris from said outlet downwardly into said bag means and reducing a velocity of air passing from said blower into said bag means; and support means attached to and extending downwardly from said housing side wall for providing clearance below said housing sufficient for said collection bag.

17. The dust collector of claim 16 wherein said outlet includes an opening discharging upwardly within said housing; and said diffuser means includes a mouth attached to said opening and communicating with said bell portion, and said bell portion includes a flared exit opening facing downwardly within said chamber.

18. The dust collector of claim 17 wherein said flared exit opening has a cross-sectional area substantially greater than a cross-sectional area of said mouth.

19. The dust collector of claim 16 wherein said diffuser means is made of a vibration damping material.

20. A portable dust collector comprising;

a housing having an outer side wall, a substantially open top, and a substantially open bottom;

a motor attached to said housing;

a blower driven by said motor and having an inlet communicating with an exterior of said housing and an outlet within said housing;

filter bag means attached to and enclosing said top for retaining particulates discharged into said interior by said blower while allowing air to pass therethrough;

collection bag means attached to and enclosing said bottom for collecting particulates retained in said interior of said housing;

a diffuser including a mouth attached to said outlet and a bell portion communicating with said mouth and having a flared exit opening facing downwardly toward said collection bag means; said diffuser being made of acrylonitrile butadiene styrene and shaped such that a cross-sectional area of said exit opening is at least four times greater than a cross-sectional area of said mouth, such that said diffuser directs effluent from said blower downwardly into said collection bag means, reduces a velocity of said effluent, and absorbs vibrations generated by said blower; and support means attached to and extending downwardly from said housing side walls for providing clearance below said housing sufficient for said collection bag.

21. A dust collector comprising:

a housing having a vertically-extending, cylindrically-shaped outer side wall forming an enclosed interior, said side wall having upper and lower rims forming an open top and an open bottom, respectively, communicating with said interior;

a vertically oriented, transverse plate attached at ends thereof to an inside surface of said side wall and extending across said interior;

an enclosure attached at one end thereof to said plate, and extending radially and horizontally therefrom to said inside surface of said side wall, thereby forming a dust-free chamber within said housing interior;

a motor mounted on said plate and extending radially and horizontally therefrom within said chamber;

a centrifugal blower mounted on said plate opposite said chamber and driven by said motor, said blower including a horizontally-extending tubular inlet conduit extending through said housing and communicating with an exterior thereof, an outlet discharging upwardly into said housing interior, and having a rotational axis which is collinear with an output shaft of said motor;

said side wall having an opening therethrough from an exterior of said housing into said interior of said chamber;

an inlet manifold mounted on an outer surface of said side wall and having a tubular portion connected to and being collinear with said inlet conduit, and a plurality of ports, each disposed at an angle to said tubular portion;

a dome-shaped filter bag removably attached to and enclosing said housing top for retaining particulates discharged into said interior by said blower;

a diffuser including a mouth attached to said outlet and a bell portion communicating with said mouth and having a flared, downwardly-facing exit opening, said diffuser being shaped such that a cross-sectional area of said exit opening is substantially greater than a cross-sectional area of said mouth, such that said diffuser directs effluent from said blower downwardly, reduces a velocity of said effluent, and absorbs sound noise generated by said blower and said effluent;

said motor, blower, and diffuser being sized and positioned within said housing to allow free passage of air and particulates through said housing;

collection bag means removably attached to and enclosing said bottom for particulates retained in said interior of said housing;

a base including forwardly mounted casters rearwardly mounted wheels, and handles; and a pair of legs extending between said housing and said base and sized to space said housing bottom above said base sufficiently to receive said collection bag beneath said housing, said legs being positioned on opposite sides of said base.

22. A portable dust collector comprising:

a housing having an outlet opening;

a motor attached to said housing;

a blower driven by said motor and positioned within said housing, said blower having an outlet discharging within said housing and a rectilinear inlet conduit extending through said housing;

filter means attached to said housing for filtering particulates from air discharged from said outlet and allowing filtered air to pass through said outlet opening;

means for collecting particulates filtered by said filter means; and a manifold attached to said housing and communicating with said inlet conduit and including a plurality of ports, each being sized and angled such that a probe having a one-half inch diameter cannot be inserted into any one of said ports and along said inlet conduit and contact said blower.

* * * * *